(12) United States Patent
Nakayama (10) Patent No.: US 6,682,425 B2
(45) Date of Patent: Jan. 27, 2004

(54) GAME SYSTEM FOR GENERATING RANDOM ON-THE-SPOT BROADCASTING DATA BASED ON PLAYER HISTORICAL PERFORMANCE DATA

(75) Inventor: Hiroyuki Nakayama, Nagoya (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/764,706

(22) Filed: Jan. 18, 2001

(65) Prior Publication Data
US 2001/0012798 A1 Aug. 9, 2001

(30) Foreign Application Priority Data
Feb. 4, 2000 (JP) .................................... 2000-032755

(51) Int. Cl.[7] .............................................. G06F 19/00
(52) U.S. Cl. ............................... 463/35; 463/43; 463/1; 463/3
(58) Field of Search ......................... 463/1, 3, 35, 40, 463/43; 273/459–461; 345/473

(56) References Cited

U.S. PATENT DOCUMENTS

| | | | | |
|---|---|---|---|---|
| 4,445,187 A | * | 4/1984 | Best ............................ | 364/521 |
| 4,569,026 A | * | 2/1986 | Best ............................ | 364/521 |
| 5,026,058 A | * | 6/1991 | Bromley ..................... | 273/93 C |
| 5,067,079 A | * | 11/1991 | Smith, III et al. ......... | 364/410 |
| 5,269,519 A | * | 12/1993 | Malone ....................... | 473/154 |
| 5,435,554 A | * | 7/1995 | Lipson ........................ | 273/88 |
| 5,507,485 A | * | 4/1996 | Fisher ......................... | 473/407 |
| 5,671,347 A | * | 9/1997 | Barstow et al. ............ | 395/173 |
| 5,735,743 A | | 4/1998 | Murata et al. | |
| 6,080,063 A | * | 6/2000 | Khosla ........................ | 463/42 |
| 6,169,555 B1 | * | 1/2001 | Yamamoto .................. | 345/473 |
| 6,193,610 B1 | * | 2/2001 | Junkin ........................ | 463/40 |
| 6,204,862 B1 | * | 3/2001 | Barstow et al. ............ | 345/473 |
| 6,217,444 B1 | * | 4/2001 | Kataoka et al. ............ | 434/252 |
| 6,458,033 B1 | * | 10/2002 | Shoji ........................... | 463/35 |
| 2001/0006909 A1 | * | 7/2001 | Mirasaki et al. ........... | 463/35 |

FOREIGN PATENT DOCUMENTS

| | | | |
|---|---|---|---|
| EP | 0830881 | 3/1998 | |
| JP | 07163754 A | * 6/1995 | ........... A63F/09/22 |
| JP | 10-211359 | 11/1998 | |
| JP | 10211359 | 11/1998 | ............. A63F/9/22 |
| JP | 11144088 | 5/1999 | ............. G06T/15/70 |

OTHER PUBLICATIONS

Links 386 CD Players Manual, 1995, Access Software, Inc. pp. 1–87.*

* cited by examiner

Primary Examiner—Teresa Walberg
Assistant Examiner—Scott E. Jones
(74) Attorney, Agent, or Firm—Jordan and Hamburg LLP (57) ABSTRACT

It is an object of the present invention to provide a game system which is capable of maximizing realism of an on-the-spot broadcasting voice or the like. A plurality of on-the-spot broadcasting data previously prepared to be used specific situation in a competition performed in a virtual game space is stored in storage medium. The information corresponding to a play record of the competition is stored as record data. When the competition enters a situation, an on-the-spot broadcasting data is selected from the plurality of on-the-spot broadcasting data by referring to the record data. Information corresponding to the selected on-the-spot broadcasting data is provided to the game user via an information output control device such as a speaker.

12 Claims, 7 Drawing Sheets

| File name | Conditions (number of round) | On-the-spot broadcasting voice |
|---|---|---|
| Data 001 | 0 | It seems that this is the first round for the player at this links. |
| Data 002 | 0 | Um, the player at this links, it is the first round for him, isn't it? |
| Data 003 | 1 | The player seems to play at this links only one time. |
| Data 004 | 1 | This is the second round for the player at this links. |
| Data 005 | 2~5 | This links is the links where the player played many times. |
| Data 006 | 2~5 | The player starts to grasp the feature of the links by his affluent play experience at the links, doesn't he? |
| Data 007 | 6~10 | The player already has so much experience playing at this links, doesn't he? |
| Data 008 | 6~10 | The player has so much experience playing at this links. |
| Data 009 | More than 11 | This links is the links which the player has known all about. |
| Data 0010 | More than 11 | It is no doubt to say that this links is the home course for the player. |

FIG. 4B

| File name | Conditions (average score) | On-the-spot broadcasting voice |
|---|---|---|
| Data 101 | Better than 5 under par | The average score of this hole... is excellent one! |
| Data 102 | Better than 5 under par | This hole seems a favorite hole for the player. |
| Data 103 | 1~4 under par | The average score of this hole... is something!. |
| Data 104 | 1~4 under par | This hole is a favorite hole for the player. |
| Data 105 | Even par | The average score of this hole... is just even par. |
| Data 106 | Even par | The average score of this hole up to now is even par, isn't it? |
| Data 107 | 1~4 over par | You know the average score of this hole... is not good one. |
| Data 108 | 1~4 over par | This hole is a little bit difficult for the player. |
| Data 109 | 5~9 over par | The average score of this hole... is not good. |
| Data 110 | 5~9 over par | The player is considerably bad at this hole. |
| Data 111 | Worse than 10 over par | The average score of this hole... um... is very bad. |
| Data 112 | Worse than 10 over par | The player is very bad at this hole. |

FIG. 4C

| File name | Conditions (best score) | On-the-spot broadcasting voice |
|---|---|---|
| Data 201 | Hole-in-one was got. | Well, the player got a hole-in-one at this hole. |
| Data 202 | Hole-in-one was got. | Does he get the concentration at the teeing ground with same one when he got the hole-in-one? |
| Data 203 | Hole-in-one was got. | The player XX(name of the player) once got a hole-in-one at this hole. |
| Data 204 | Albatross was got. | The player XX(name of the player) once recorded an albatross at this hole. |
| Data 205 | Albatross was got. | The player once got an albatross at this hole, didn't he? |
| Data 206 | Albatross was got. | The player once got an albatross at this hole. |
| Data 207 | Eagle was got. | It seems that the player got an eagle at this hole. |
| Data 208 | Eagle was got. | At this hole, the player also got an eagle. |
| Data 209 | Eagle was got. | Can he get an eagle as he did in his past round? |
| Data 210 | Eagle was got. | Can he make an eagle shot again as he did? |

FIG. 5

GAME SYSTEM FOR GENERATING RANDOM ON-THE-SPOT BROADCASTING DATA BASED ON PLAYER HISTORICAL PERFORMANCE DATA

BACKGROUND OF THE INVENTION

1. Field of the Invention

The present invention relates to a game system directing a game world by superimposing an on-the-spot broadcasting information with voice or the like on a game picture.

2. Description of the Related Art

There exists a various genres of the games. For example, a direction technique enhancing a reality of the game by superimposing on-the-spot broadcasting voice on a game picture has been adopted up to these days. However, only an on-the-spot broadcasting voice data corresponding to each scene of the athletic game in one-to-one basis is generated in advance, and the voice data is merely reproduced as voice by selecting the data corresponding to each scene.

As a result, a same voice of on-the-spot broadcasting is always reproduced for the same scene, therefore there is no difference in the voice of on-the-spot broadcasting even if the user (player) of the game experiences a plurality of a same scene. There also exists a technique to prepare a plurality of the voice data of on-the-spot broadcasting for one scene and to choose one voice data of on-the-spot broadcasting by utilizing random numbers or the like. However, the above selection is conducted just by the random way and it is not conducted in the manner of properly choosing a voice data of on-the-spot broadcasting in accordance with each game scene. Furthermore it does not sufficiently utilize the direction effect by the voice data of on-the-spot broadcasting.

SUMMARY OF THE INVENTION

It is an object of the present invention to enable to provide with information of most suitable voice data for each game scene to the game user, thereby providing a game system and a computer readable storage medium in which the best direction effect by the voice of on-the-spot broadcasting is realized.

There will be explained below the present invention.

In order to solve the above problems, one aspect of the present invention is a game system which displays a picture describing a situation where a predetermined competition is performed in a virtual game space on a screen of a display device, and provides on-the-spot broadcasting information explaining said competition situation via a predetermined information output device to a user of the game, comprising; an on-the-spot broadcasting data storing device for storing a plurality of on-the-spot broadcasting data made previously as candidates for on-the-spot broadcasting data to be used at the specific scene of said competition; a record data generation device for generating information corresponding to a play record of the competition as a record data, a record data storing device for storing the record data, a data selecting device for selecting a on-the-spot broadcasting data to be used at a game scene from said plurality of on-the-spot broadcasting data by referring to said record data when the competition goes into the specific scene, and an information output control device for providing the user with on-the-spot broadcasting information corresponding to the selected on-the-spot broadcasting data via the information output device.

According to this aspect, as on-the-spot broadcasting data is selected by referring to the play record, the reality of the on-the-spot broadcasting information can be enhanced by providing the user with on-the-spot broadcasting information considering the past achievement when the user of the game gets the same scene again where the player achieved an excellent performance, thereby the interest in the game can be increased.

Another aspect of the present invention is a computer readable storage medium for the game system by utilizing a computer which displays a picture on the screen of the display device showing a state where a predetermined competition is performed in a virtual game space and provides a game user with on-the-spot broadcasting information explaining a situation of the competition via a predetermined output device, wherein the computer readable storage medium stores a plurality of on-the-spot broadcasting data made previously as candidates for on-the-spot broadcasting data to be used at the specific scene of said competition and a program formed so as to make the computer function as: a record data generation device for generating information corresponding to a play record of the competition as a record data and for storing the data in a predetermined storage device, a data selecting device for selecting a on-the-spot broadcasting data to be used at a game scene from said plurality of on-the-spot broadcasting data by referring to said record data when the competition goes into the specific scene, and an information output control device for providing the user with on-the-spot broadcasting information corresponding to the selected on-the-spot broadcasting data via the information output device.

According to this aspect, the program is executed by reading it by the computer so that the computer can serve as the game system of the present invention.

The game system and a storage medium may further comprise a voice output device as the information output device and a plurality of on-the-spot broadcasting voice data for outputting on-the-spot broadcasting voice explaining the situation of the competition via the voice output device as the plurality of on-the-spot broadcasting data.

In such a case, as on-the-spot broadcasting data is selected by referring to the play record, the reality of the on-the-spot broadcasting information can be enhanced by providing the user with on-the-spot broadcasting information considering the past achievement when the user of the game gets the same scene again where the player achieved an excellent performance, thereby the interest in the game can be increased. Especially, as the on-the-spot broadcasting information is provided to the user as a voice, a competition in the actual world can be correctly reproduced in the game space by the game picture and its on-the-spot broadcasting voice, thereby the interest in the game can be highly increased.

In another aspect of the present invention for the game system and a storage medium, the record data may be corresponding to the play record of the competition for the user. The record data may correspond to the play record of the competition of the character appearing in the game space. Golf may be played as the competition and the record data includes information corresponding to at least one of a number of play times at the course set as a stage of the golf or a number of stroke in the past for each hole constituting the course.

In this application, "on-the-spot broadcasting information" means what has the game user recognize a scene where a virtual announcer or commentator of the game explains various kind of competitions performed in the game space to the audience in the game space or the audience that watches the competition via a broadcasting of the television, especially "on-the-spot broadcasting voice" means what expresses the information with voice.

The information output device includes both what is made by voice and what is made by an image.

DESCRIPTION OF THE PREFERRED EMBODIMENTS

Figure 1:
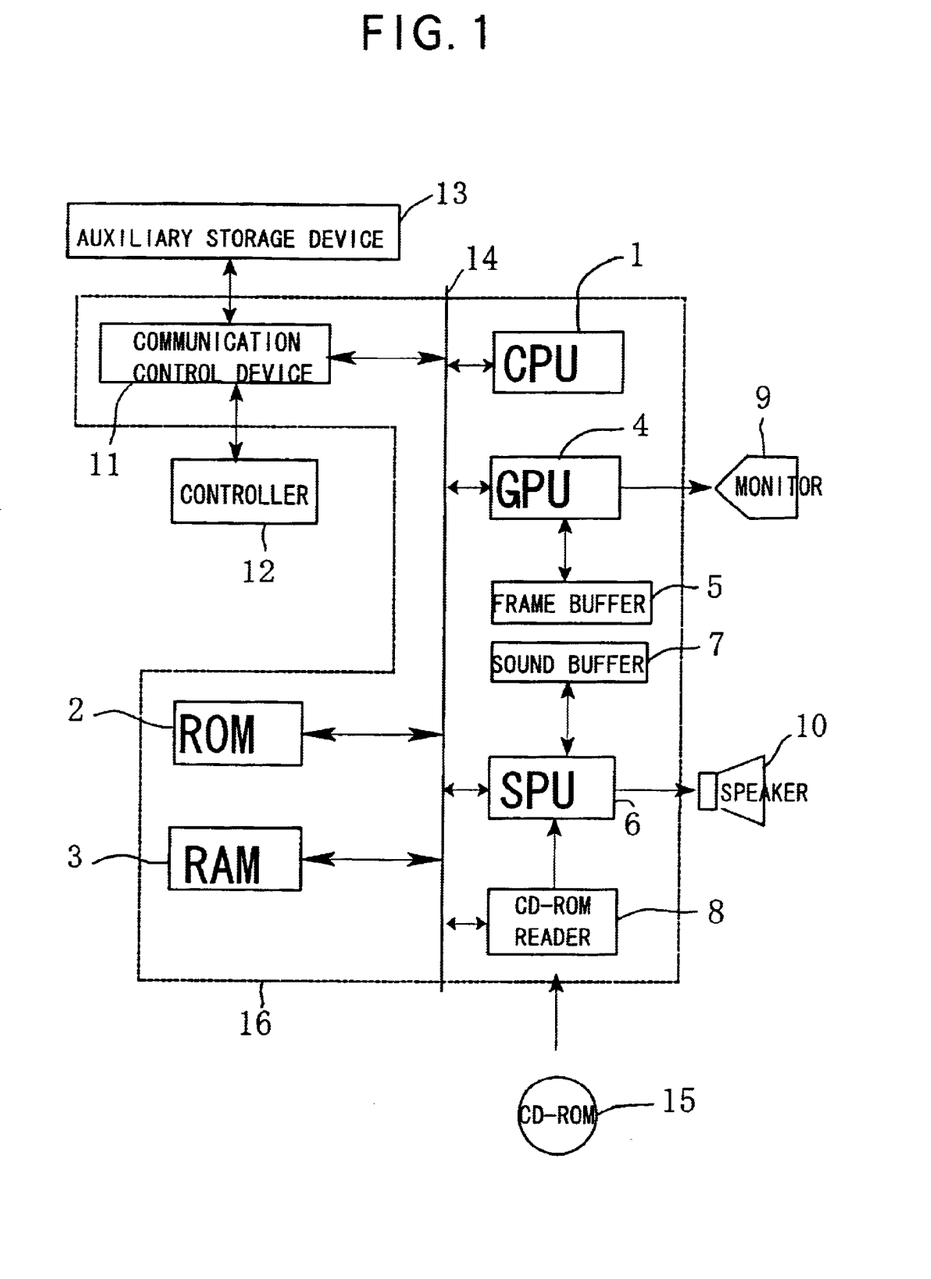
FIG. 1 is a block diagram showing the control system of the golf game system of this invention.

FIG. 1 is a block diagram showing the control system constituted as an embodiment of the home-use golf game system of this invention. In the home-use game system, a predetermined game proceeds according to a game program stored in a CD-ROM as a storage medium.

This game system comprises a CPU 1 constituted mainly with microprocessor, a ROM 2 and a RAM 3 as the main storage devices for the CPU 1, a graphics processing unit (GPU) 4 and a sound processing unit (SPU) 6 for image processing and sound processing, buffers 5 and 7 for these units, and a CD-ROM reader 8. The operating system as a program required for controlling total operation of the game machine is written on ROM 2. The program and the data for the game read out from CD-ROM 15 as memory medium are written as required on RAM 3. GPU 4 draws a game picture on the frame buffer 5 by receiving an image data from CPU 1, transforms the drawn image data into a predetermined video reproduction signal, and outputs it to a monitor 9 at a predetermined timing. The SPU 6 reproduces voice or music data and sound source data that are read out from CD-ROM 15 and are stored in sound buffer 7, and output them via speaker 10. The CD-ROM reader 8 reads out the program and data stored on the CD-ROM 15 in line with the command issued by CPU 1, and outputs signal corresponding to the contents read out. A home-use television set as a monitor and a built-in speaker of the television set as a speaker 10 are used.

Further, a communication control device 11 is connected to CPU 1 via bus 14. A controller 12 and an auxiliary storage device 13 are connected to the device 11 in a detachable manner. Controller 12 functions as an input device and comprises an operation member which receives the operation of the game user (player). The communication control device 11 scans an operation state of an operation member of the controller 12 at a constant interval (for example: 1/60 seconds), and outputs a signal to CPU 1 corresponding to the scanning result. CPU 1 judges the operation state of controller 12 based on the signal. The controller 12 and the auxiliary storage device 13 are connectable to the communication device 11 in plural and parallel.

In the constitution described above, constitution elements other than monitor 9, speaker 10, controller 12, CD-ROM 15, and auxiliary storage device 13 are totally accommodated in a predetermined housing and constitutes a main body 16 of the game machine as a computer.

Figure 2:
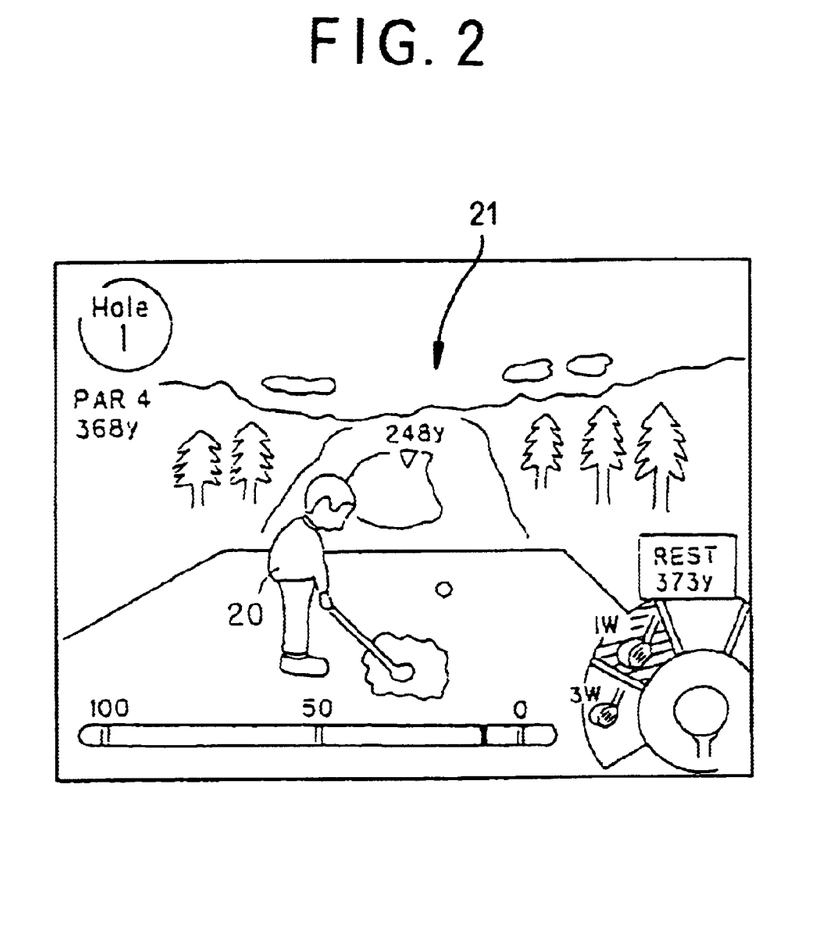
FIG. 2 is a diagram showing an example picture displaying a scene when a shot is made in the golf game system of FIG. 1.

A program and data are stored in the CD-ROM 15 to perform a predetermined golf game. FIG. 2 shows an example of a picture used in the golf game. This golf game proceeds by the procedure capturing links 21 displayed on the screen as if the player of the game plays the golf in the actual links by operating the controller 12 so as to operate a golfer 20 as a character.

A plurality of the golfer 20 and links 21 are prepared. The game user can select one of the golfer 20, participate in the tournament using predetermined links and compete with other golfers for strokes. CPU 1 generates a play record data of the user's play result of the tournament and has the RAM 3 store it. The play record data on the RAM 3 is stored in auxiliary storage device 13 by the predetermined storing operation to the controller 12.

Figure 3A:
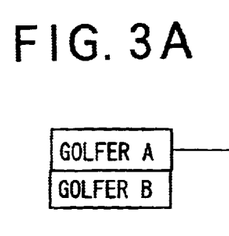
FIGS. 3A, 3B, 3C, and 3D are diagrams showing example for play record data to be made in the golf game system of FIG. 1.
Figure 3B:
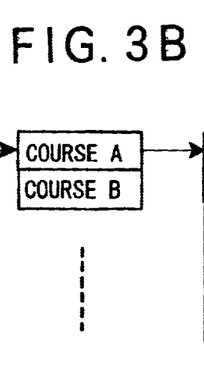
Figure 3C:
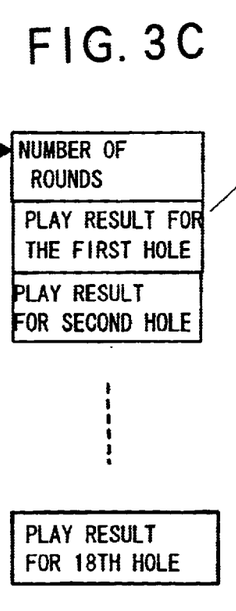
Figure 3D:
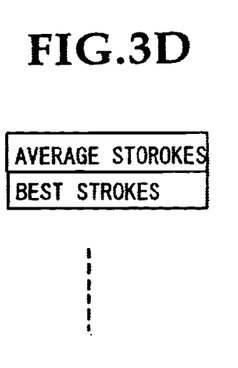

FIGS. 3A, 3B, 3C, and 3D show one example of a play record data. The play record data is made by each golfer 21 (FIG. 3A). The play record data for each golfer is further made by each links (FIG. 3B). Data of each links includes information regarding the times of plays and scores from starting to finishing hole. Scores for each hole includes an average and the minimum number of strokes (FIG. 3D).

On the other hand, image data for displaying an image for each links or golfer 20 on the monitor 9 and voice data output via the speaker 10 during the tournament.

Figure 4A:
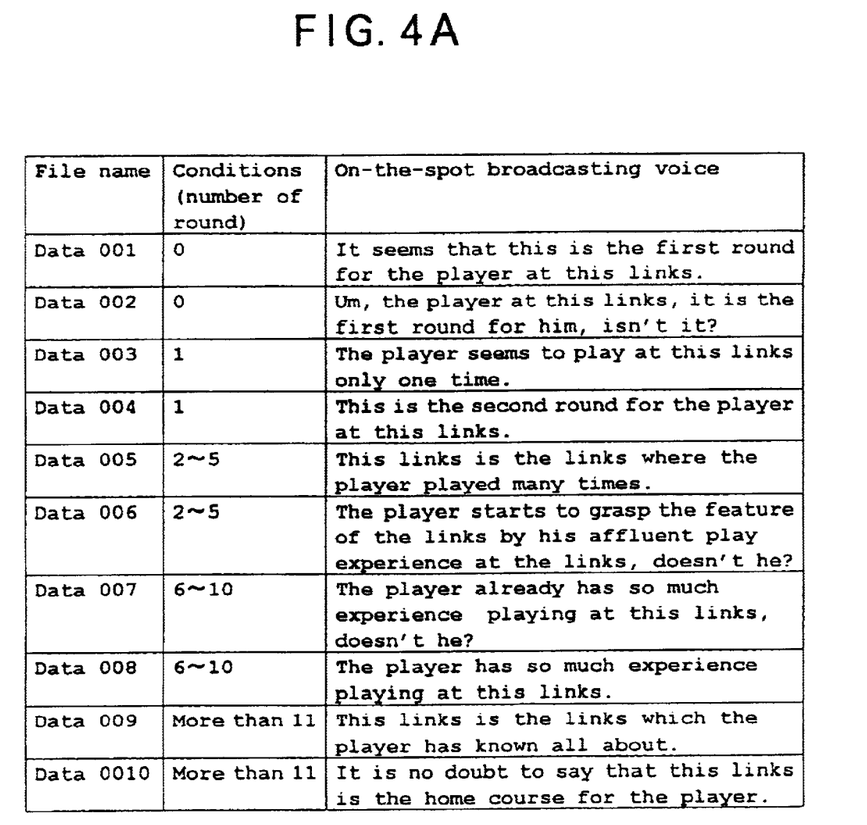
FIGS. 4A, 4B and 4C are diagrams showing examples of selected on-the-spot broadcasting voice data based on play record data of FIG. 3.
Figure 4B:
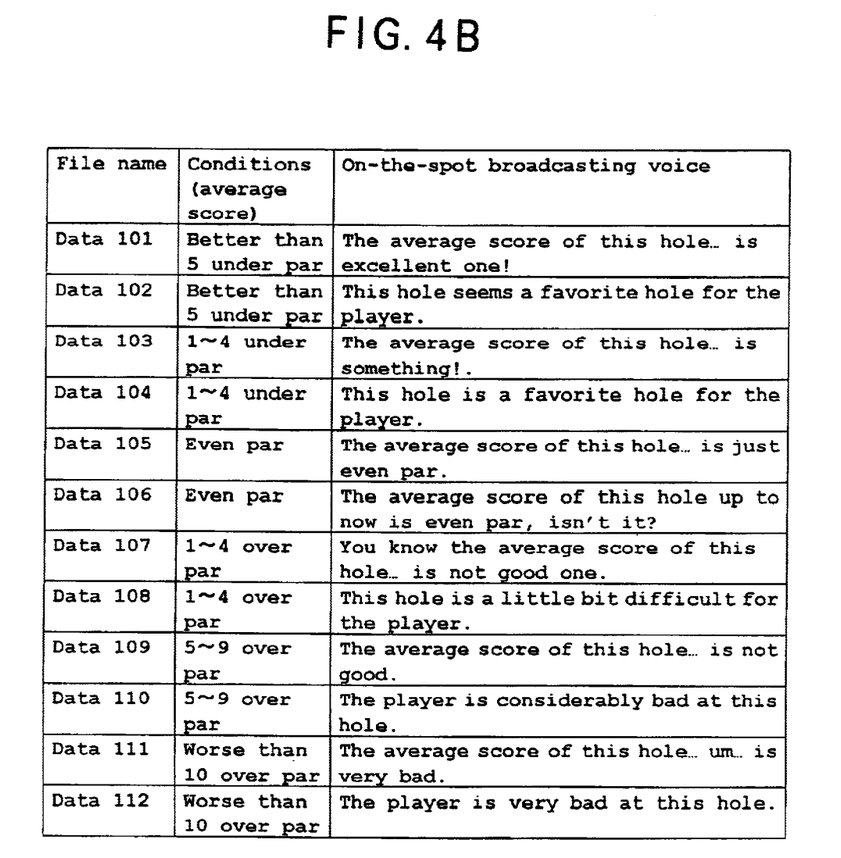
Figure 4C:
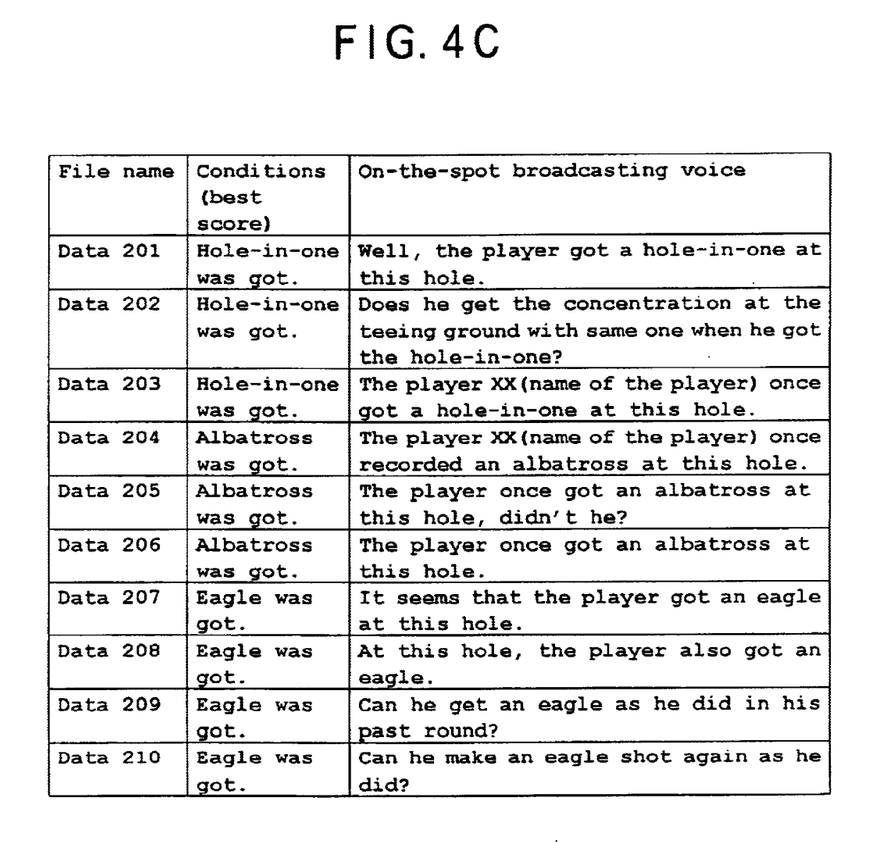

The voice data is prepared for each scene of the game. One example of this is shown in FIGS. 4A, 4B and 4C. FIG. 4A is one example of on-the-spot broadcasting voice data used at a beginning of the tournament. FIG. 4B is one example of on-the-spot broadcasting voice data used at a scene where the golfer 20 moves to the predetermined links during the tournament. FIG. 4C is one example of on-the-spot broadcasting voice data used at a scene where the golfer 20 tees up. A plurality of on-the-spot broadcasting voice data are prepared for each scene and each data is controlled by putting own file names. Each file has a condition to be selected and the condition is stored in CD-ROM 15 corresponding to the file name.

As for the group of on-the-spot broadcasting voice data shown in FIG. 4A, number of rounds of the golfer 20 regarding the course where the tournament is held is set as a condition for selection. The number of rounds can be specified by referring information for the number of the rounds of above described play record data(FIG. 3C).

As for the group of on-the-spot broadcasting voice data shown in FIG. 4B, average score of the golfer 20 at the hole to be played is set as a condition for selection. The average score can be specified by the difference between the average strokes of above mentioned play record data (FIG. 3D) and the standard strokes previously set by each links. The standard strokes is made as an own data for each links and stored in CD-ROM 15 together with other information such as the name of the links. However the on-the-spot broadcasting voice data satisfying the condition shown in FIG. 4B can be extracted only by the play record data if an average score (a value subtracting the standard strokes from the average strokes) is memorized instead of the average strokes in the play record data.

As for a group of on-the-spot broadcasting voice data shown in FIG. 4C, the best score of the golfer 20 at the hole to be played is set as a condition for selection. The best score can be specified by the minimum strokes (FIG. 3D) in the above described play record data or by the difference between the minimum strokes and the standard strokes for each links. As widely known, if the minimum stroke is "one", then it means Hole-in-One. If the minimum strokes are smaller than the standard strokes by three strokes, then it makes Albatross. If the minimum strokes are smaller than the standard strokes by two strokes, then it makes Eagle. However the on-the-spot broadcasting voice data satisfying the condition shown in FIG. 4C can be extracted only by the play record data if a flag for judging whether or not there exists an experience of Hole-in-One, Albatross or Eagle is set in the play record data and the state of the flag is changed based on the play record of the golfer 20.

Figure 5:
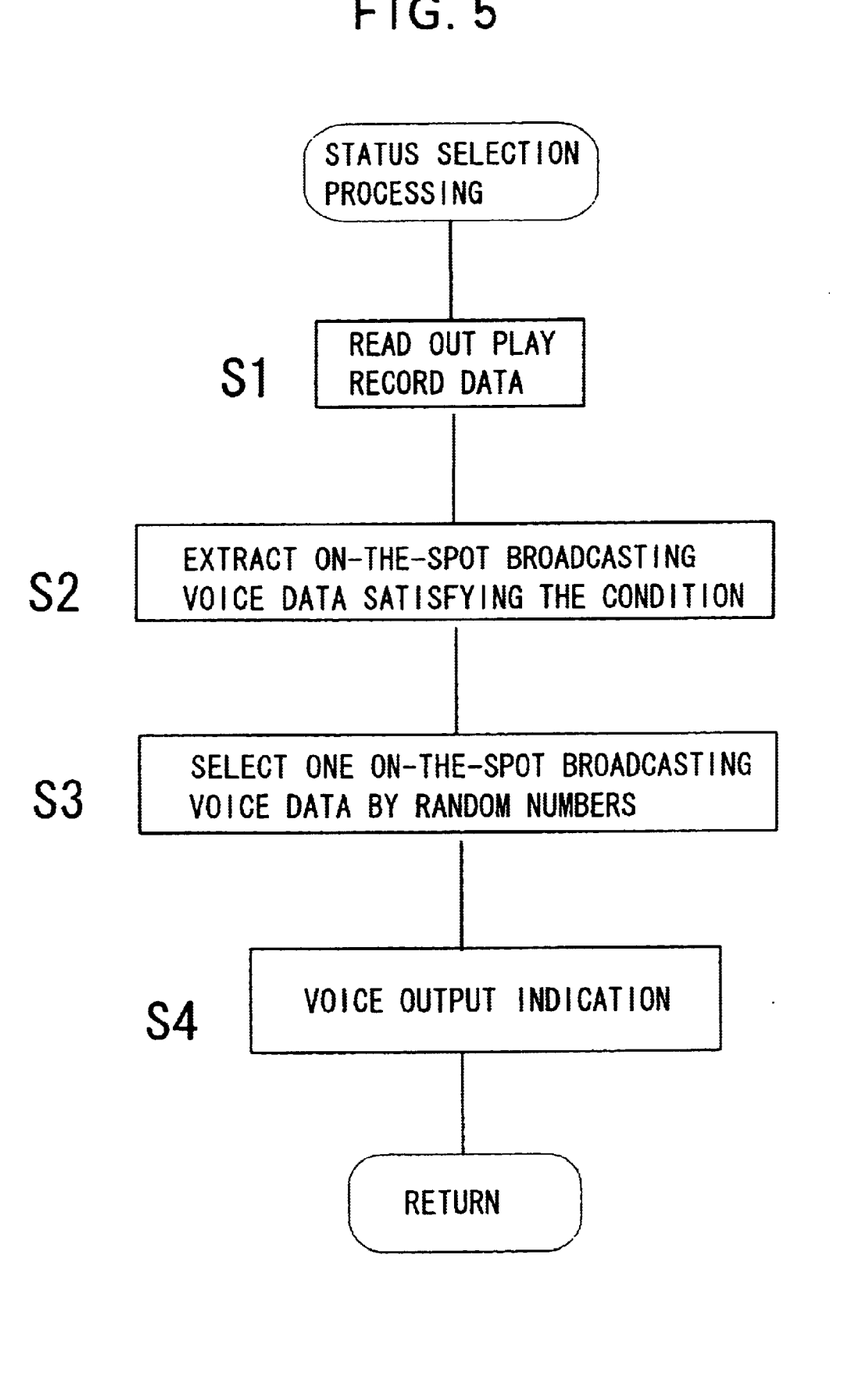
FIG. 5 is a flowchart showing a procedure of on-the-spot broadcasting voice data selection process executed for selecting on-the-spot broadcasting voice data fitting to the scene from the play record data of FIG.4.

When the game proceeds to the specific scene of the game where each group of data should be used, CPU 1 performs processing described in FIG. 5 and selects one of each on-the-spot broadcasting voice data. In this processing, CPU 1 firstly reads out the play record data from the auxiliary storage device 13 to RAM 3 (step S1, however it is skipped if the data is already read out to RAM 3). Then CPU 1 extracts on-the-spot broadcasting voice data fitting to the past play record data of the golfer 20 by referring to the information corresponding to the settled condition regarding a group of on-the-spot broadcasting voice data to be used at the specific scene among the read-out play record data (step S2).

As for the data shown in FIG. 4, more than two of the on-the-spot broadcasting voice data are extracted as the on-the-spot broadcasting voice data which satisfies the condition. Therefor one on-the-spot broadcasting voice data is selected from them by utilizing random numbers (step S3). Then, by reading out the on-the-spot broadcasting voice data from CD-ROM 15 and passing it to SPU 6, a on-the-spot broadcasting voice corresponding to the on-the-spot broadcasting voice data is generated via speaker 10.

According to the processing described above, the round number of the golfer 20 regarding the course where the tournament is held in the play record data, at the specific scene of the beginning of the tournament for example, is referred. If the round number is "zero", then Data 001 and Data 002 are extracted in step S2. Furthermore, one of these data is selected in step S3, and an on-the-spot broadcasting voice saying. "It seems that the player plays this links for the first time." is generated via the speaker 10 as a voice corresponding to the data in step S4.

Thus, in this embodiment of the invention, as the on-the-spot broadcasting voice is selected by referring to the play record of the golfer 20, it is possible to output more suitable on-the-spot broadcasting voice for the game scene than the case where only the random numbers are used for the selection of on-the-spot broadcasting voice, thereby the interest in the game is more increased.

In addition, although the on-the-spot broadcasting information is provided to the game user by utilizing voice in the above embodiment, the on-the-spot broadcasting information also may be provided via a screen of the monitor 9, for example. The play record data may be made by each character or user of the game.

This invention is widely applicable not only to the golf game but to the game including various kind of competition factor such as various kind of sports, matches, challenges to the record or the like.

As described above, according to this invention, the information regarding play record is stored as record data and the most suitable information such as on-the-spot broadcasting voice is selected by referring to the record data when the game proceeds to a specific scene, thereby the most suitable information such as on-the-spot broadcasting voice can be provided to the game user and direction effect by on-the-spot broadcasting voice or the like is maximized.

What is claimed is:

1. A game system which displays a picture of a situation where a predetermined form of competition is performed in a virtual game space on a screen of a display device, and provides on-the-spot broadcasting information explaining said situation via a predetermined information output device to a user of the game, comprising:

an on-the-spot broadcasting data storing device for storing a plurality of on-the-spot broadcasting data made previously as candidates for on-the-spot broadcasting data to be used at specific scenes of said competition;

a record data generation device for generating information corresponding to a play record of said competition as a record data, a record data storing device for storing said record data, a data selecting device for selecting an on-the-spot broadcasting data to be used at a game scene from said plurality of on-the-spot broadcasting data based on said record data when said competition goes into said specific scene, and an information output control device for providing said user with on-the-spot broadcasting information corresponding to the selected on-the-spot broadcasting data via said information output device, wherein said plurality of on-the-spot broadcasting data has a condition parameter set corresponding to information included in a record data to each of said plurality of on-the-spot broadcasting data;

said data selecting device selects two or more of on-the-spot broadcasting data having said condition satisfied by said record data from said plurality of on-the-spot broadcasting data; and said data selecting device selects randomly one on-the-spot broadcasting data from the selected two or more of on-the-spot broadcasting data for outputting.

2. A game system according to claim 1, wherein, a voice output device is provided as said information output device and said plurality of on-the-spot broadcasting data includes a plurality of on-the-spot broadcasting voice data for outputting on-the-spot broadcasting voice explaining a situation of said competition via said voice output device.

3. A game system according to either of claim 1 or 2, wherein said record data corresponds to a play record of the competition for said user playing the game.

4. A game system according to either of claim 1 or 2, wherein said record data corresponds to a play record of said competition of a character appearing in said game space.

5. A game system according to either of claim 1 or 2, wherein golf is played as said competition and said on-the-spot broadcast data is selected based on said record data including information corresponding to a number of play times at a course set as a stage of the golf or a number of strokes in past competition for each hole constituting the course.

6. A computer readable storage medium for a game system utilizing a computer to display a picture on a screen of a display device showing a state where a predetermined form of competition is performed in a virtual game space which provides a game user with on-the-spot broadcasting information explaining a situation of said competition via a predetermined output device, the computer readable storage medium storing data and executable code for:

a plurality of on-the-spot broadcasting data made previously as candidates for on-the-spot broadcasting data to be used at specific scenes of said competition; and a program formed so as to make said computer function as:

a record data generation device for generating information corresponding to a play record of said competition as a record data and for storing the record data in a predetermined storage device, a data selecting device for selecting an on-the-spot broadcasting data to be used at a game scene from said plurality of on-the-spot broadcasting data based on said record data when said competition goes into one of said specific scenes, and an information output control device for providing the user with on-the-spot broadcasting information corresponding to the selected on-the-spot broadcasting data via said information output device, wherein said plurality of on-the-spot broadcasting data has a condition parameter set corresponding to information included in a record data to each of said plurality of on-the-spot broadcasting data;

said data selecting device selects two or more of on-the-spot broadcasting data having said condition satisfied by said record data from said plurality of on-the-spot broadcasting data; and said data selecting device selects randomly one on-the-spot broadcasting data from the selected two or more of on-the-spot broadcasting data for outputting.

7. A game system for a player to play a game which displays game situations in a virtual game space on a screen of a display device, comprising:

an input device for permitting the player to select an identifier;

a record data generation and storage device for generating a play record of the player for each game played and storing a plurality play records of a plurality of completed games played by the player associated with said identifier of the player to thereby store a play history of the player;

a commentary information data storing device for storing a plurality of commentary information data associated with a plurality of possible game situations in combination with possible play histories of a plurality of completed games;

a data selecting device for'selecting a commentary information data from the plurality of commentary information data based on correspondence of first parameters with second parameters, wherein:

said first parameters include a game situation being displayed and said play records of the plurality of completed games associated with said identifier of said player; and said second parameters include the possible game situation and said possible play history of the plurality of completed games associated with the selected commentary information data; and an information output device for outputting to said player with said selected commentary information data during display of the game situation, wherein:

at least two commentary information data of said plurality of commentary information data have said second parameters corresponding with said first parameters;

said data selecting device initially selects said at least two commentary information data have said second parameters corresponding with said first parameters and finally randomly selects one of said at least two commentary information data to said information output device for outputting to said player.

8. A game system according to claim 7 wherein, said information output device outputs sound and said plurality of commentary information data is audio data.

9. A game system according to either of claim 7, wherein said record data generation and storage device generates and stores a play record of a competitor character of the player.

10. The game system according to either of claim 7 or 8, wherein:

the game is golf;

the possible play histories include a number of times a player has played a given course set as a stage of the golf game;

the play history includes a number of times the player using the identifier has played a given course set as a stage of the golf game over the plurality of completed games.

11. The game system according to claim 10, wherein:

the possible play histories include numbers of strokes a player has taken at a given hole of a course over the plurality of completed games; and the play histories include numbers of strokes the player using the identifier has taken at each hole of a course over the plurality of completed games.

12. The game system according to either of claim 7 or 8, wherein:

the game is golf;

the possible play histories include number of strokes a player has taken at a given hole of a course over the plurality of completed games; and the play histories include numbers of strokes the player using the identifier has taken at each hole of a course over the plurality of completed games.

* * * * *